US012475868B2

(12) United States Patent
Drucker

(10) Patent No.: US 12,475,868 B2
(45) Date of Patent: Nov. 18, 2025

(54) PLAYABLE, REMOVABLE COVER FOR USE WHILE PLAYING AN ELECTRONIC CYMBAL

(71) Applicant: Richard A. Drucker, Plano, TX (US)

(72) Inventor: Richard A. Drucker, Plano, TX (US)

( * ) Notice: Subject to any disclaimer, the term of this patent is extended or adjusted under 35 U.S.C. 154(b) by 287 days.

(21) Appl. No.: 18/311,127

(22) Filed: May 2, 2023

(65) Prior Publication Data

US 2023/0351985 A1 Nov. 2, 2023

Related U.S. Application Data

(60) Provisional application No. 63/337,504, filed on May 2, 2022.

(51) Int. Cl.
*G10D 13/02* (2020.01)
*G10D 13/10* (2020.01)
*G10H 3/14* (2006.01)

(52) U.S. Cl.
CPC ............. *G10D 13/26* (2020.02); *G10H 3/143* (2013.01); *G10H 2220/525* (2013.01)

(58) Field of Classification Search
CPC ... G10D 13/26; G10H 3/143; G10H 2220/525
See application file for complete search history.

(56) References Cited

U.S. PATENT DOCUMENTS 4,037,509 A 7/1977 Slomovits
5,922,980 A * 7/1999 Arteaga ................. G10D 13/24 84/411 M
8,759,652 B2 * 6/2014 Caprarola .............. G10D 13/14 84/411 M
9,530,390 B1 * 12/2016 Hildner .................. G10D 13/03
D985,046 S * 5/2023 Lee ................................ D17/22
D1,069,892 S 4/2025 Drucker
2002/0059861 A1 * 5/2002 Yoshino ................. G10D 13/02 84/402
2004/0011186 A1 * 1/2004 Hester, III ............ G10D 13/10 84/453
2012/0227568 A1 9/2012 Caprarola
(Continued)

FOREIGN PATENT DOCUMENTS

WO 2010044651 A2 4/2010

OTHER PUBLICATIONS

Restriction Requirement dated Jul. 16, 2024, U.S. Appl. No. 29/875,320, filed May 2, 2023.

(Continued)

*Primary Examiner* — Robert W Horn
(74) *Attorney, Agent, or Firm* — Conley Rose, P.C.; Michael W. Piper; Gayatry Nair

(57) ABSTRACT

A playable, removable cover for use while playing an electronic cymbal is disclosed. The cover comprises an opening configured to enable a connector to be coupled to the electronic cymbal, The opening is located on a top of the electronic cymbal when the cover is installed on the electronic cymbal. The cover also comprises a plurality of seams. The plurality of seams are located underneath the electronic cymbal when the cover is installed on the electronic cymbal. The cover is made of a material that comprises elastic characteristics, which minimizes the creation of air gaps formed under the cover and enables one or more elements of the electronic cymbal to be delineated.

20 Claims, 9 Drawing Sheets

(56) References Cited

U.S. PATENT DOCUMENTS

| | | | | |
|---|---|---|---|---|
| 2014/0260897 | A1 * | 9/2014 | Miyashita .............. | G10H 3/146 84/422.3 |
| 2016/0203804 | A1 * | 7/2016 | Carpenter, Sr. ........ | G10D 13/10 84/422.3 |
| 2018/0204557 | A1 * | 7/2018 | Steinhauser ........... | G10D 13/02 |
| 2018/0247622 | A1 * | 8/2018 | Evans .................... | G10G 7/005 |
| 2023/0351985 | A1 * | 11/2023 | Drucker ............... | G10D 13/063 |
| 2024/0144903 | A1 * | 5/2024 | Recchia ................. | G10D 13/06 |

OTHER PUBLICATIONS

Drucker, Richard A., et al. "Playable, Removable Cover for Use While Playing an Electronic Cymbal," filed May 2, 2022, U.S. Appl. No. 63/337,504.

Drucker, Richard A., et al."Electronic Cymbal Cover," filed May 2, 2023 U.S. Appl. No. 29/875,320.

Ex Parte Quayle dated Aug. 27, 2024, U.S. Appl. No. 29/875,320, filed May 2, 2023.

Red Cymbals. https://redcymbals.com/products/cymbalsox. "Cymbal Sox—Cymbal Protectors / Covers". Sep. 2023 (Year: 2023).

Amazon. https://www.amazon.com/Meinl-Cymbals-MCD-14-14-Inch-Divider/dp/B004XJ M K5C/ref=sr_1_75?crid=LC42VKJY3PN4&dib=eyJ2ljoiMSJ9.gxjPSzPo8-m8R4ppRISVaNaWwOvNClmulwSERqF6eeD2aPDQUpjmaHaQxio5QJnu_RufPCjk5u6pREK2 . . . "Meinl Cymbals MCD-14 14-Inch Cymbal Divide". Jan. 2011 (Year: 2011).

Amazon.com. https://www.amazon.com/Cymbag-CY16B K-Case-for-Cymbals/dp/B004XOXO6G?th=1. "CY16BK Case for Cymbals" . Jun. 2010 (Year: 2010).

Sweetwater. https ://www.sweetwater.com/store/detai 1/61001--sabian-leather-cymbal-pads? m rkgad id= &m rkgcl =28&m rkgen = &m rkg bflag =&m rkgcat= &accti d=21700000001645388 &dskeyword id =92700080522836058&1 id =92700080522836058 &ds_s_kwg id= . . . . "Sabian Leather Cymbal Pads—1-pair". Date Unknown: Viewed Aug. 2024 (Year: 2024).

Notice of Allowance dated Nov. 21, 2024, U.S. Appl. No. 29/875,320, filed May 2, 2023.

* cited by examiner

PLAYABLE, REMOVABLE COVER FOR USE WHILE PLAYING AN ELECTRONIC CYMBAL

CROSS-REFERENCE TO RELATED APPLICATIONS

The present application claims priority to U.S. Provisional Application No. 63/337,504, filed May 2, 2022, entitled "PLAYABLE, REMOVABLE COVER FOR USE WHILE PLAYING AN ELECTRONIC CYMBAL," by Richard A. Drucker, which is incorporated herein by reference in their entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

There are electronic drums and acoustic drums. Cymbals are often a part of both electronic drums and acoustic drums. There are different types of cymbals including a bell cymbal, a china cymbal, a clash cymbal, a crash cymbal, a crash/ride cymbal, a finger cymbal, a flat ride cymbal, and a hi-hat. Electronic cymbals include rubberized discs or pads that aim to mimic the natural feel and response of an acoustic cymbal. Electronic cymbals have piezoelectric sensors built inside that translate a stick strike into electrical signals that are used to trigger the desired cymbal sample in an electronic drum module.

SUMMARY

In an embodiment, a playable, removable cover for use while playing an electronic cymbal is disclosed. The cover comprises an opening configured to enable a connector to be coupled to the electronic cymbal, The opening is located on a top of the electronic cymbal when the cover is installed on the electronic cymbal. The cover also comprises a plurality of seams. The plurality of seams are located underneath the electronic cymbal when the cover is installed on the electronic cymbal. The cover is made of a material that comprises elastic characteristics, which minimizes the creation of air gaps formed under the cover and enables one or more elements of the electronic cymbal to be delineated.

In another embodiment, a method of installing and using a playable, removable cover on an electronic cymbal is disclosed. The method comprises placing the cover on the electronic cymbal. The cover comprises an opening configured to enable a connector to be coupled to the electronic cymbal. The opening is located on a top of the electronic cymbal when the cover is installed on the electronic cymbal. The cover is made of a material that comprises elastic characteristics, which minimizes the creation of air gaps formed under the cover and enables one or more elements of the electronic cymbal to be delineated. The method also comprises coupling the connector to the electronic cymbal via the opening in the cover. The method further comprises playing the electronic cymbal with the cover installed thereon.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Figure 1A:
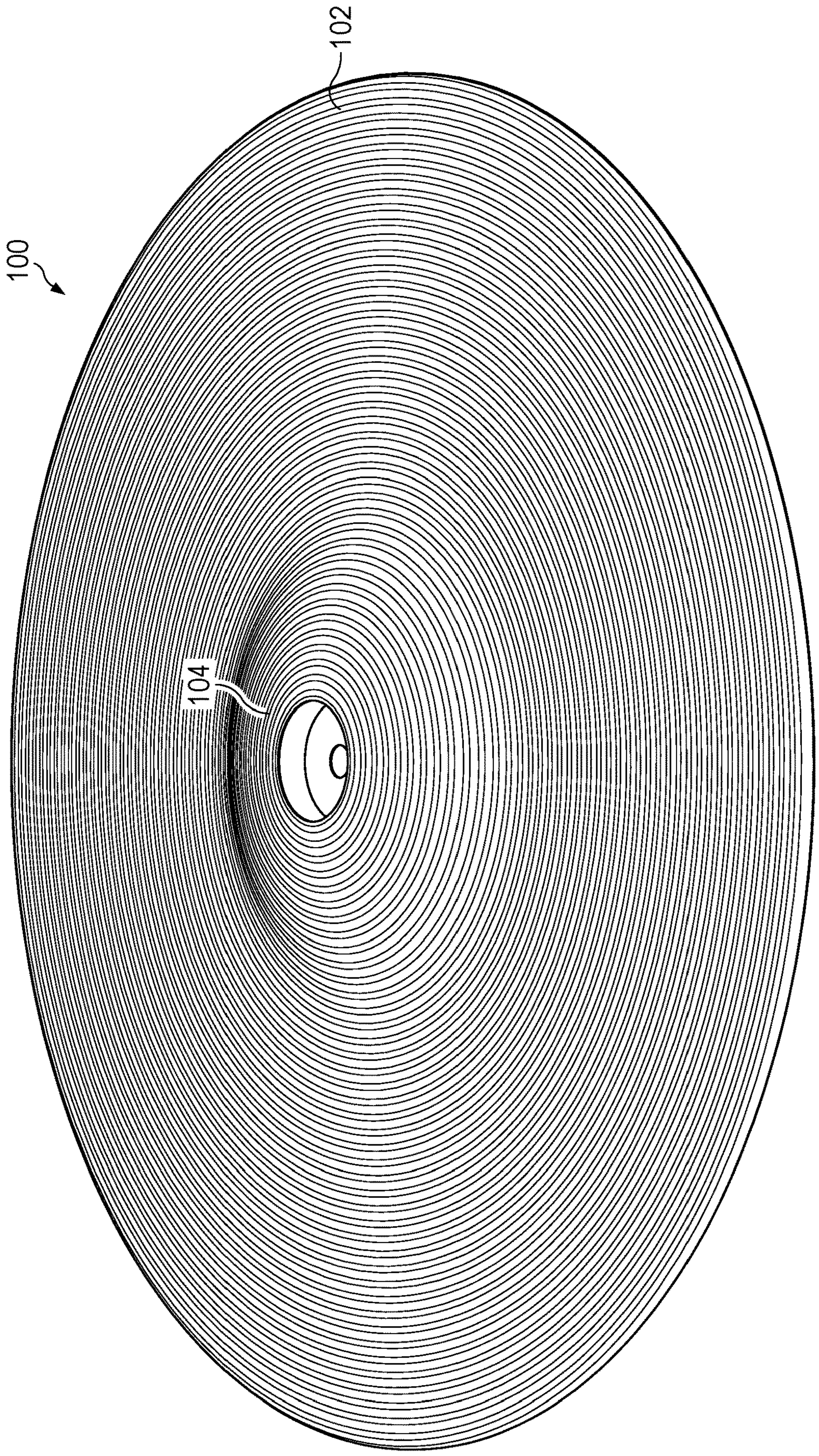
FIG. 1A illustrates a top perspective view of an electronic cymbal according to an embodiment of the disclosure.
Figure 1B:
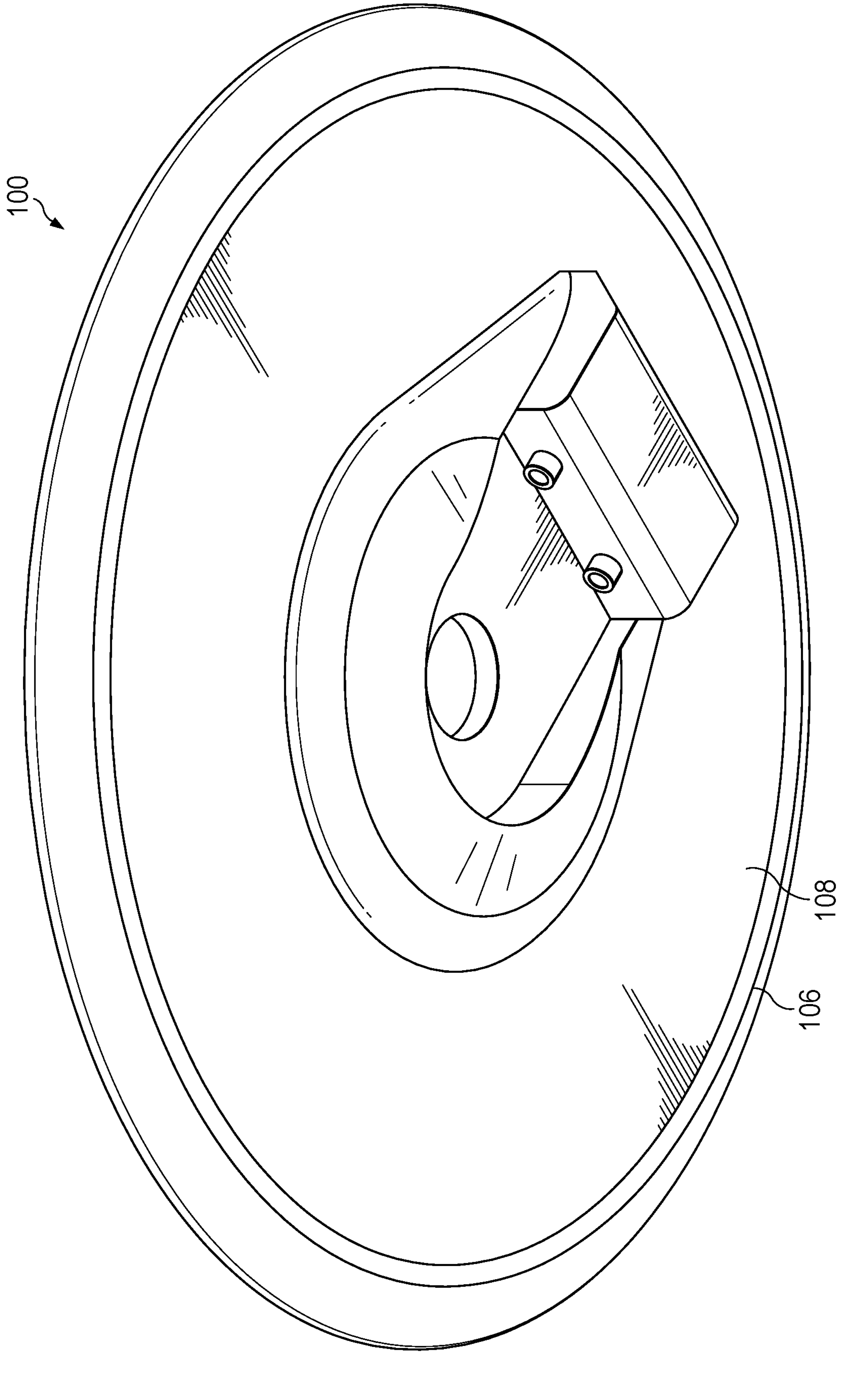
FIG. 1B illustrates a bottom perspective view of an electronic cymbal according to an embodiment of the disclosure.
Figure 2:
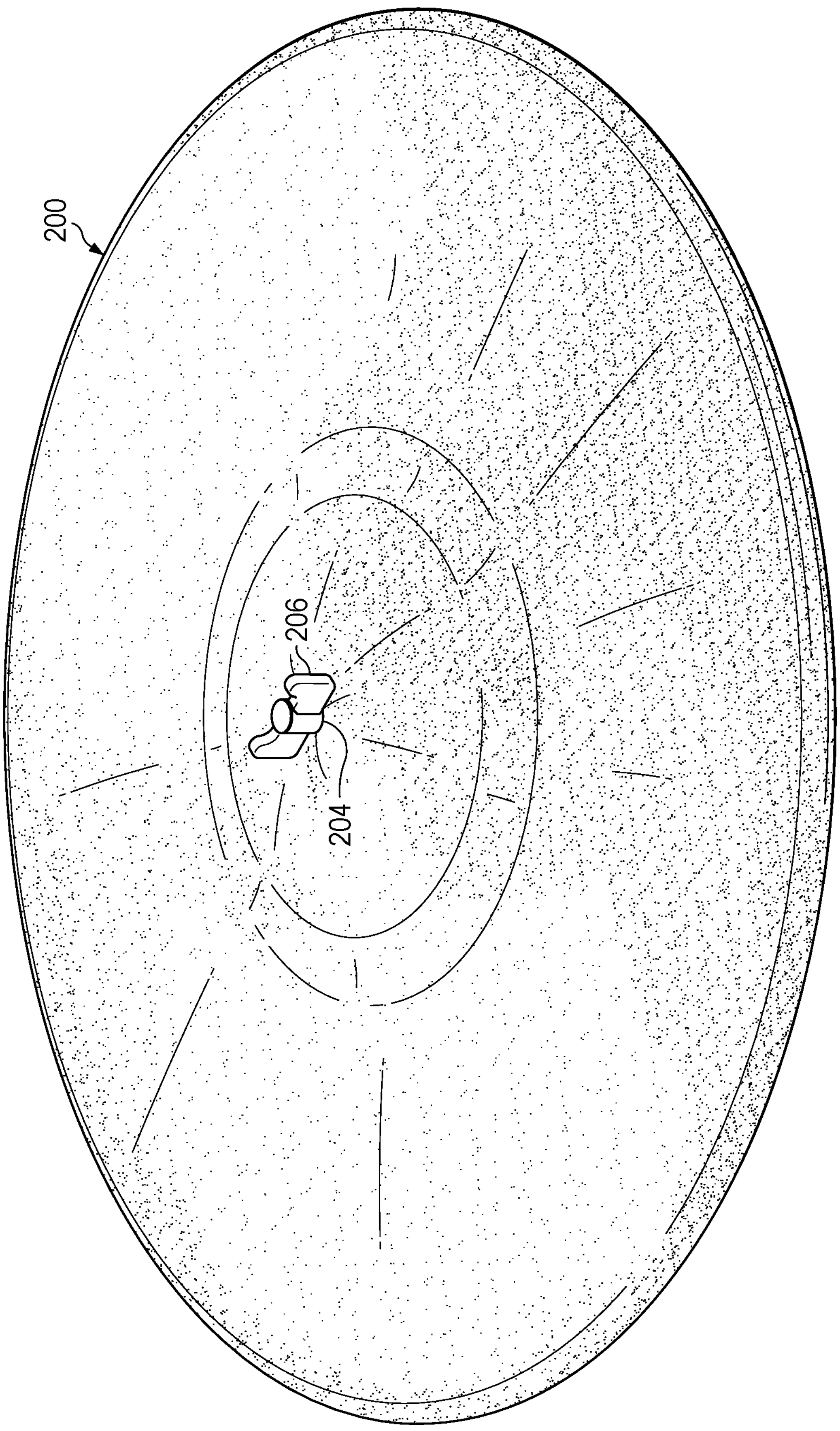
FIG. 2 illustrates a top perspective view of a cover on an electronic cymbal according to an embodiment of the disclosure.
Figure 3:
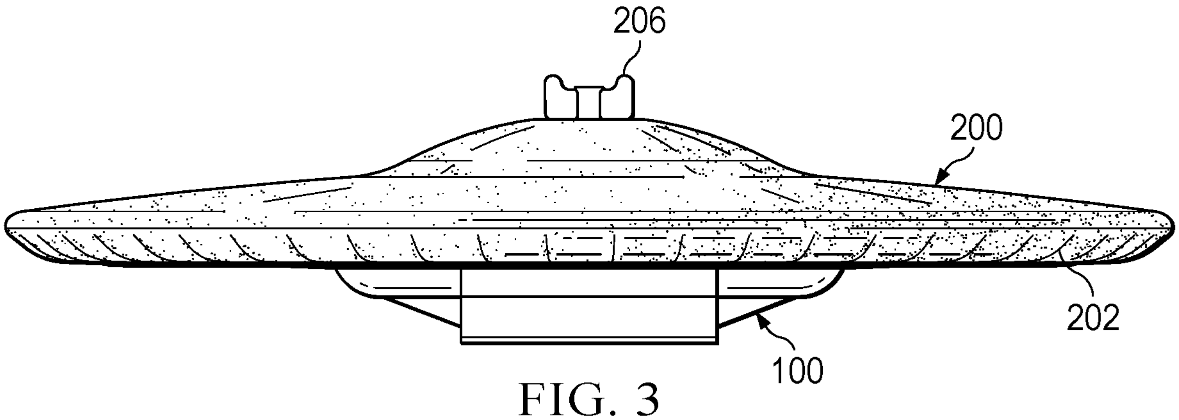
FIG. 3 illustrates a front view of a cover on an electronic cymbal according to an embodiment of the disclosure.
Figure 4:
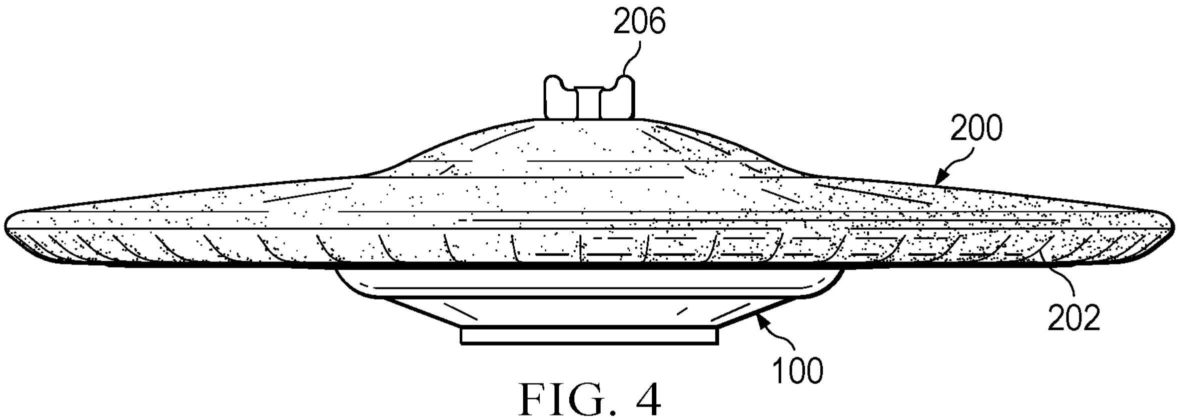
FIG. 4 illustrates a rear view of a cover on an electronic cymbal according to an embodiment of the disclosure.
Figure 5:
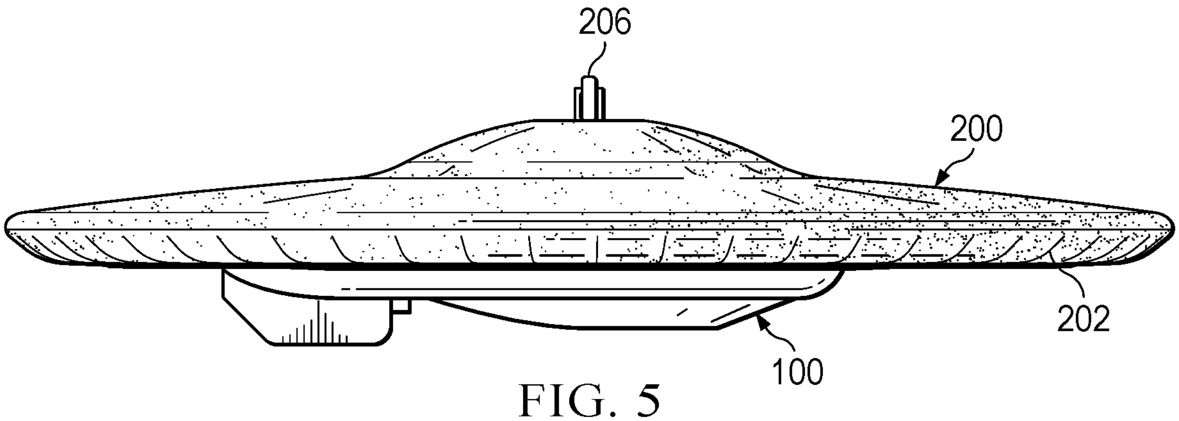
FIG. 5 illustrates a right side view of a cover on an electronic cymbal according to an embodiment of the disclosure.
Figure 6:
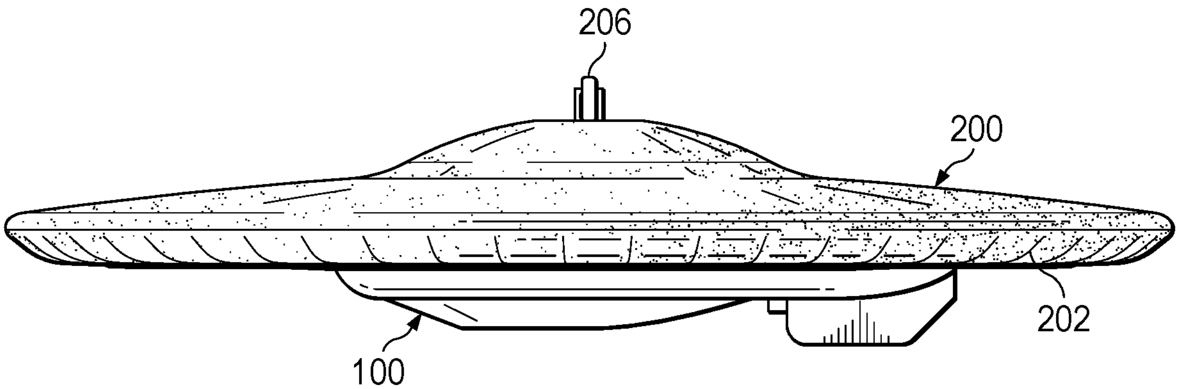
FIG. 6 illustrates a left side view of a cover on an electronic cymbal according to an embodiment of the disclosure.
Figure 7:
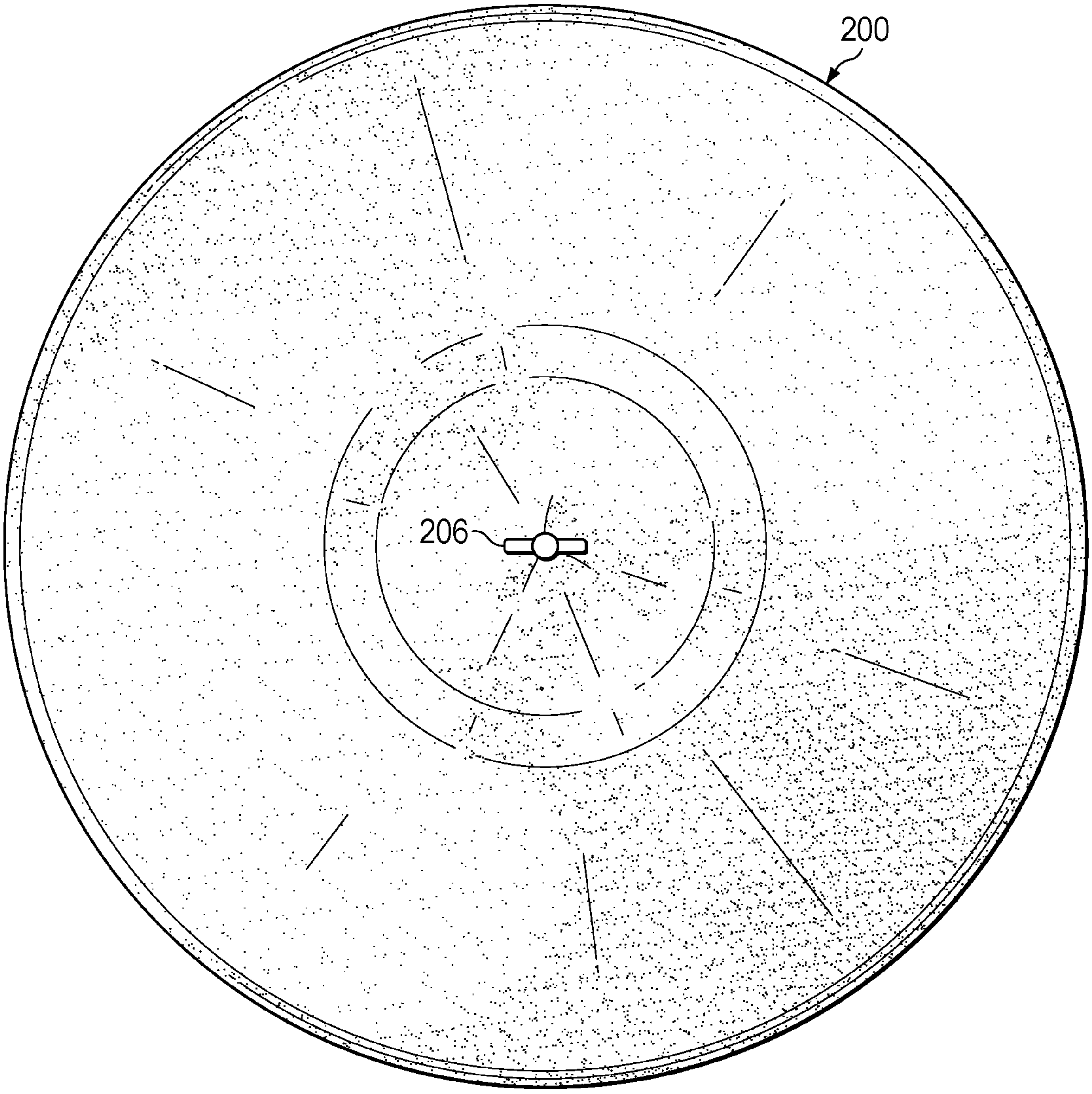
FIG. 7 illustrates a top view of a cover on an electronic cymbal according to an embodiment of the disclosure.
Figure 8:
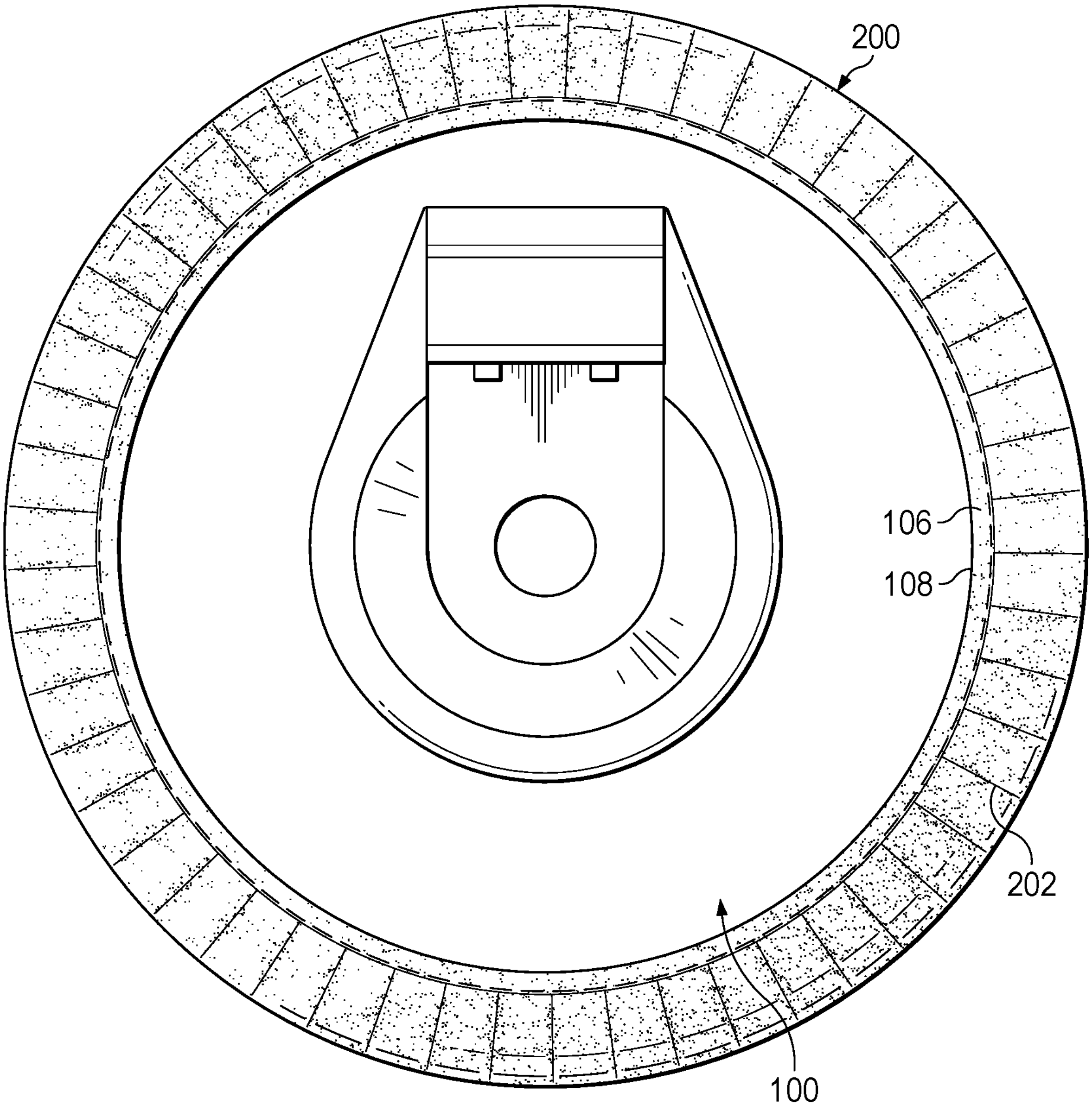
FIG. 8 illustrates a bottom view of a cover on an electronic cymbal according to an embodiment of the disclosure.
Figure 9:
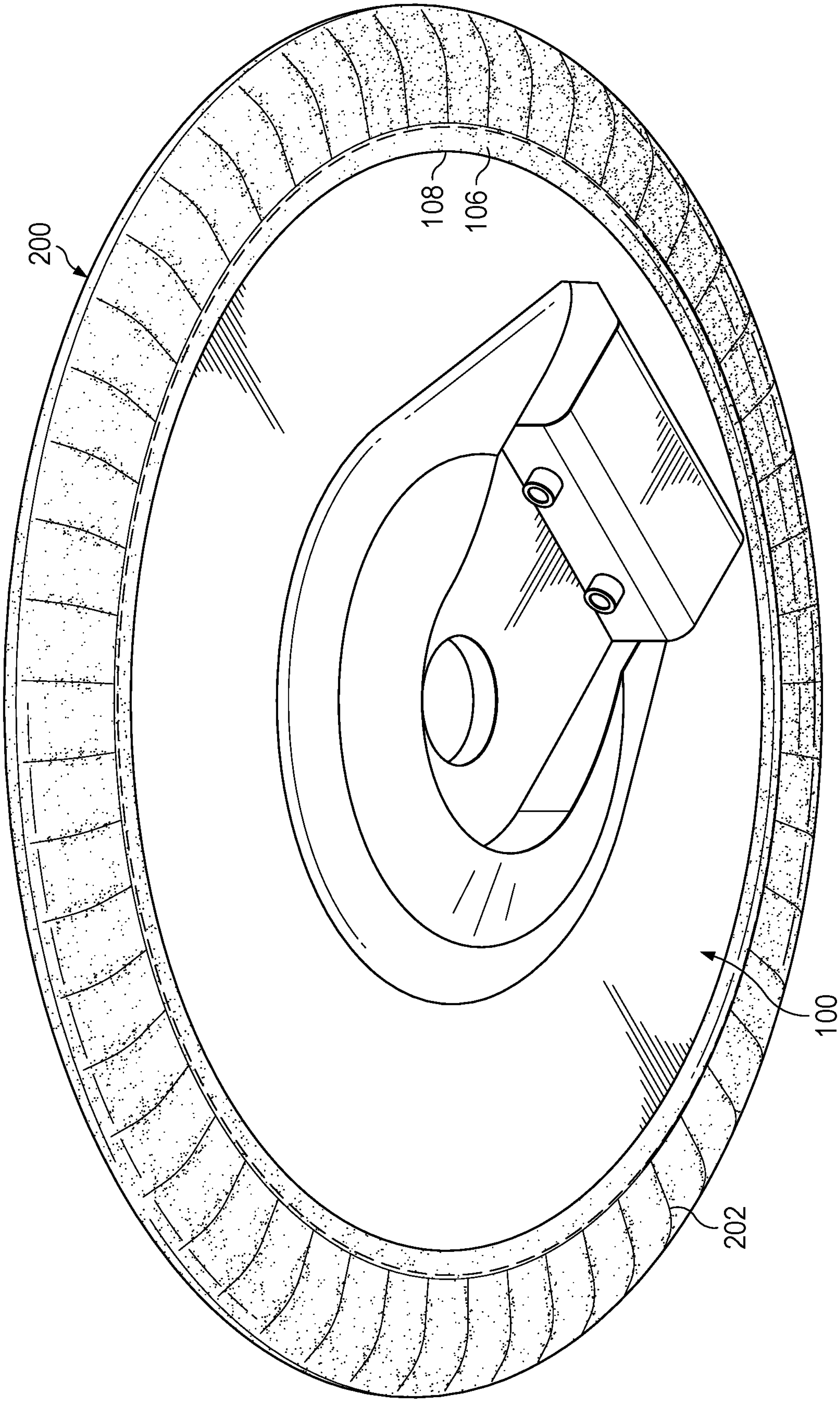
FIG. 9 illustrates a bottom perspective view of a cover on an electronic cymbal according to an embodiment of the disclosure.

Turning first to FIGS. 1A and 1B, an electronic or digital cymbal 100 is illustrated. Specifically, FIG. 1A illustrates the top of the electronic cymbal 100 while FIG. 1B illustrates the bottom of the electronic cymbal 100. Electronic cymbals come in different shapes and sizes. The electronic cymbal 100 illustrated in FIGS. 1*a* and 1*b* is just one non-limiting example of an electronic cymbal. The electronic cymbal 100 includes rubberized discs or pads 102 that aim to mimic the natural feel and response of an acoustic cymbal. The electronic cymbal 100 may include one or more elements such as a bell 104. The electronic cymbal 100 may include a transition point 106 on the bottom of the electronic cymbal 100 where the rubber cymbal material ceases and a different material that encases the electrical parts begins. In an embodiment, the transition point 106 occur at the start of a lip that transitions to a more recessed surface 108 than the outer rim of rubber cymbal material. The electronic cymbal 100 has piezoelectric sensors built inside that translate a stick strike into electrical signals that are used to trigger the desired cymbal sample in an electronic drum module.

Turning next to FIGS. 2-9, disclosed herein is a playable, removable cover 200 for use while playing the electronic cymbal 100. The cover 200 may be made from a material (e.g., a fabric, etc.) with particular elastic characteristics. For example, the material may comprise 4-25% spandex, 5-20% spandex, 6-15% spandex, or another range of percentage spandex. In some embodiments, the cover 200 may be made of a different material with similar elastic characteristics to the percentages of spandex given above. In a non-limiting example, the cover 200 may be made of fabric that comprises 92% polyvinyl chloride (PVC) and 8% spandex such as the Happy Span fabric sold by NOVATEX International. In another non-limiting example, the cover 200 may be made of fabric that comprises 90% PVC and 10% spandex such as Moon Span fabric sold by NOVATEX International. The particular elastic characteristics of the material used for the cover 200 enables the cover 200 to be easily installed over the electronic cymbal 100 as well as contributes to the durability of the cover 200. Further, the particular elastic characteristics of the material used for the cover 200 allows the material to more closely fit the shape of the electronic cymbal 100 and minimizes the creation of large air gaps formed under the cover 200. This in turn allows the cover 200 to fit the electronic cymbal 100 in such a way that one or more elements of the electronic cymbal 100 (e.g., the bell 104) are delineated so that the beginning and/or ending of the one or more elements are visible to the individual playing the electronic cymbal 100. If large air gaps were present under the cover 200, one or more elements of the electronic cymbal 100 would not be delineated making it difficult for the individual playing the electronic cymbal 100 to visually identify where the one or more elements began and/or ended. Further, a large air gap could affect the sound produced by hitting the electronic cymbal 100.

The cover 200 may be made from a material (e.g., a fabric, etc.) having a particular thickness. For example, the cover 200 may be made from a material that is 0.2-1.2 millimeters in thickness, 0.3-1.0 millimeters in thickness, or some other range of thickness. In a non-limiting example, the cover 200 may be made of fabric having a thickness of 0.6 millimeter such as the Happy Span fabric or the Moon Span fabric sold by NOVATEX International and discussed above. The particular thickness of the material used for the cover 200 enables the material to more closely fit the shape of the electronic cymbal 100 and minimizes the creation of large air gaps formed under the cover 200. As mentioned above, this in turn allows the cover 200 to fit the electronic cymbal 100 in such a way that one or more elements of the electronic cymbal 100 are delineated so that the beginning and/or ending of the one or more elements are visible to the individual playing the electronic cymbal 100. If the material is too thick, a large air gap would be present disguising the delineation of one or more elements (e.g., the bell 104) of the electronic cymbal 100, thereby making it harder for an individual playing the electronic cymbal 100 to see where that element begins and/or ends. Additionally, if the material is too thick, the cover 200 could affect the sound produced by hitting the electronic cymbal 100 by interfering with the reading of the piezoelectric sensor because the material is too thick and/or because of the presence of the large air gap resulting from the use of a material that is too thick. Finally, if the material is too thick, installation of the cover 200 on the electronic cymbal 100 may be more difficult. On the other hand, if the material is too thin, the cover 200 will be less durable.

The cover 200 may be made by cutting material with the particular characteristics discussed above to a particular size to fit around the electronic cymbal 100. The particular size of the cover 200 is such that the cover 200 ends underneath the electronic cymbal 100. The cover 200 should extend far enough underneath the electronic cymbal 100 to secure the cover 200 to the electronic cymbal 100. For example, for some electronic cymbals, the cover 200 may extend to about the transition point 106 on the bottom of the electronic cymbal 100 where the rubber cymbal material ceases and a different material that encases the electrical parts begins. In an embodiment, the transition point 106 occur at the start of a lip that transitions to the more recessed surface 108 than the outer rim of rubber cymbal material. For some electronic cymbals, it may be beneficial for the cover 200 not to extend past a certain point on the bottom of the electronic cymbal 100 so as to not interfere with one or more sensors or other components of the electronic cymbal 100. For example, with a hi-hat electronic cymbal, the cover 200 may not extend past the circular rim on the bottom of the top cymbal where the dome begins that pushes down on the bottom cymbal of the hi-hat. Alternatively, the cover 200 may extend past the circular rim on the top cymbal of the electronic hi-hat, but be made of thin enough material so as to not interfered with the dome pushing down on the bottom cymbal of the electronic hi-hat.

The cover 200 may be stitched on the portion of the material that is located on the bottom of the electronic cymbal 100 when in use on the electronic cymbal 100. For example, the material may be gathered and stitched around the perimeter of the portion of the material that is located on the bottom of the electronic cymbal 100 when in use on the electronic cymbal 100 creating a plurality of seams 202. The seams 202 may be approximately equidistant from each other (e.g., plus or minus 2 millimeters plus, plus or minus 3 millimeters, or plus or minus another amount) and approximately the same length (e.g., plus or minus 2 millimeters, plus or minus 3 millimeters, or plus or minus another amount). In one non-limiting example, the seams 202 may be approximately 1.5 centimeters from each other and approximately 4.5 centimeters in length. The space between each seam and the length of each seam may depend upon the size of the cover 200 and what size electronic cymbal 100 the cover 200 is to be installed upon. The plurality of seams 202 may increase the tautness of fit around the electronic cymbal 100, thereby enabling a smoother and more secure fit of the cover 200 around the electronic cymbal 100. When installed, the entirety of the seams 202 may be underneath the electronic cymbal 100 (i.e., on the bottom of the electronic cymbal). In some embodiments, a different technique may be used to create tautness and secure the cover 200 to the electronic cymbal 100. For instance, a draw string may be used to tighten the cover 200 around the electronic cymbal 100.

The diameter of the cover 202 when not installed on the electronic cymbal 100 may be smaller than the diameter of the electronic cymbal 100 due to the elasticity of the material of the cover 200. The diameter of the cover 200 may be such that the cover 200 is installed tightly enough when placed on the electronic cymbal 100 that it is secured around the electronic cymbal 100, but loose enough that the cover 200 lays flatly over the elements of the electronic cymbal 100 with reduced air gaps such that the delineation of the elements is evident to an individual looking at the electronic cymbal 100. For example, the cover 200 may be cut and stitched to allow about an extra half to a quarter of an inch of fabric to enable the cover 200 to lie tightly and flatly over the electronic cymbal 100 without large air gaps. Large air gaps would make it difficult to see the delineation of the elements of the electronic cymbal 100 and may affect the sound produced by hitting the electronic cymbal 100 by interfering with the reading of the piezoelectric sensor.

As part of the method of making the cover 200, an opening 204 may be created in the center of the cover 200. The opening 204 may be of a size and shape to enable a connector 206, such as a wing nut, to be coupled to the electronic cymbal 100 to attach the electronic cymbal 100 to a stand. In some embodiments, the opening 204 is created as part of the manufacturing process. Alternatively, the opening 204 may be created after the cover 200 is manufactured. Additionally, as part of the method of making the cover 200, elastic may be added such as via stitching to the end of the cover 200. Adding elastic to the end of the cover 200 allows the cover 200 to firmly attach to the electronic cymbal 100 yet still be flexible.

The cover 200 may be installed over the electronic cymbal 100 and used while playing the electronic cymbal 100. Because of the characteristics of the material used to make the cover 200 (e.g., elasticity, thickness, etc.) as well as the construction of the cover 200 (e.g., sizing and fit, existence and placement of the seams, etc.), an individual can strike the cover 200 on the top of the electronic cymbal 100 without striking a large air gap or a seam, thereby allowing the electronic cymbal 100 and the piezoelectric sensors and/or other interior circuits within the electronic cymbal 100 to perform as they would without the cover 200 on the electronic cymbal 100.

Figure 10:
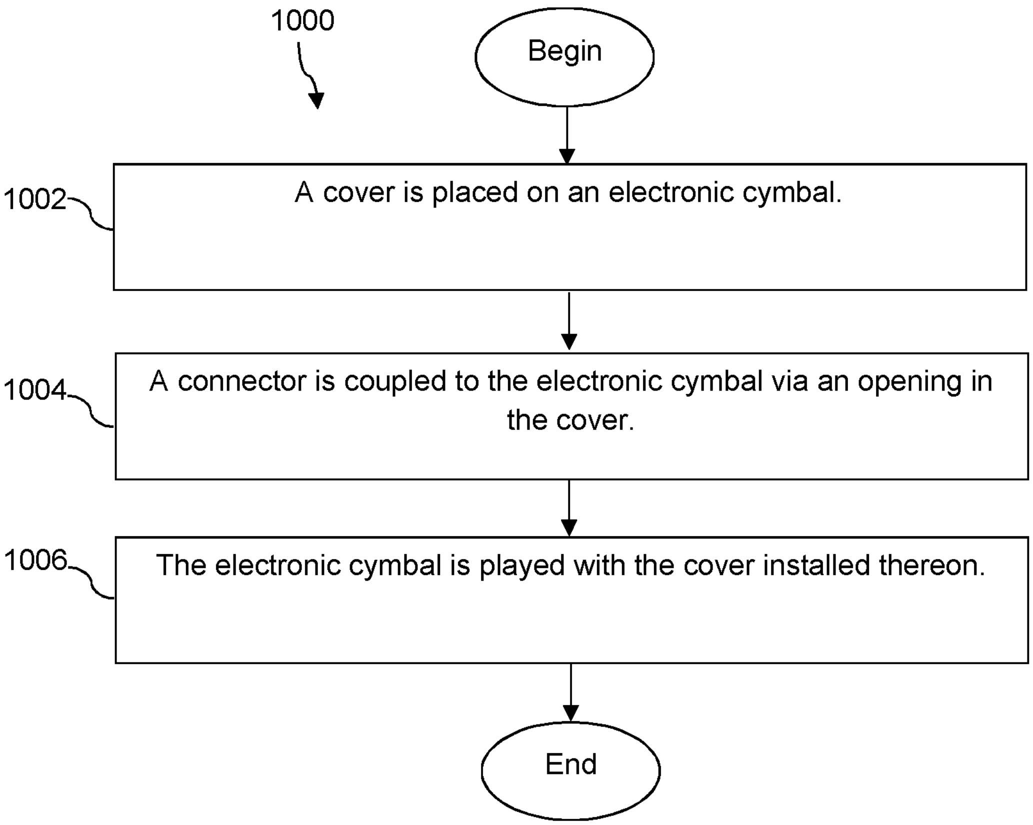
FIG. 10 illustrates a flow chart of a method according to an embodiment of the disclosure.

Turning to FIG. 10, a method 1000 is described. At block 1002, a cover (e.g., the cover 200) is placed on an electronic cymbal (e.g., the electronic cymbal 100). At block 1004, a connector (e.g., the connector 206) is coupled to the electronic cymbal via an opening (e.g., the opening 204) in the cover. At block 1006, the electronic cymbal is played with the cover installed thereon. In an embodiment, playing the electronic cymbal may comprise striking the cover on the electronic cymbal without striking an air gap.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A playable, removable cover for use while playing an electronic cymbal, the cover comprising:

an opening configured to enable a connector to be coupled to the electronic cymbal, wherein the opening is located on a top of the electronic cymbal when the cover is installed on the electronic cymbal; and a plurality of seams, wherein the plurality of seams are located underneath the electronic cymbal when the cover is installed on the electronic cymbal, and wherein the cover is made of a material that comprises elastic characteristics, which minimizes the creation of air gaps formed under the cover and enables one or more elements of the electronic cymbal to be delineated.

2. The playable, removable cover of claim 1, wherein the material comprises 4% to 25% spandex.

3. The playable, removable cover of claim 1, wherein the material comprises 5% to 20% spandex.

4. The playable, removable cover of claim 1, wherein the material comprises 6% to 15% spandex.

5. The playable, removable cover of claim 1, wherein the material comprises 92% polyvinyl chloride (PVC) and 8% spandex.

6. The playable, removable cover of claim 1, wherein the material comprises 90% polyvinyl chloride (PVC) and 10% spandex.

7. The playable, removable cover of claim 1, wherein the one or more elements of the electronic cymbal comprises a bell.

8. The playable, removable cover of claim 1, wherein a thickness of the material is 0.2 millimeters to 1.2 millimeters.

9. The playable, removable cover of claim 1, wherein a thickness of the material is 0.3 millimeters to 1.0 millimeters.

10. The playable, removable cover of claim 1, wherein the plurality of seams are approximately equidistant from each other and approximately the same length.

11. The playable, removable cover of claim 1, wherein when installed on the electronic cymbal, the cover extends to a transition point on the bottom of the electronic cymbal, and wherein the transition point is where a rubber cymbal material ends and a different material that encases electrical parts of the electronic cymbal begins.

12. A method of installing and using a playable, removable cover on an electronic cymbal for use while playing the electronic cymbal, the method comprising:

placing the cover on the electronic cymbal, wherein the cover comprises an opening configured to enable a connector to be coupled to the electronic cymbal, wherein the opening is located on a top of the electronic cymbal when the cover is installed on the electronic cymbal, wherein the cover overlays a bell of the electronic cymbal when the cover is installed on the electronic cymbal, and wherein the cover is made of a material that comprises elastic characteristics, which minimizes the creation of air gaps formed under the cover and enables one or more elements of the electronic cymbal including the bell to be delineated;

coupling the connector to the electronic cymbal via the opening in the cover; and playing the electronic cymbal with the cover installed thereon.

13. The method of claim 12, wherein playing the electronic cymbal comprises striking the cover on the electronic cymbal without striking an air gap.

14. The method of claim 12, wherein the material comprises 4% to 25% spandex.

15. The method of claim 12, wherein the material comprises 92% polyvinyl chloride (PVC) and 8% spandex.

16. The method of claim 12, wherein the material comprises 90% polyvinyl chloride (PVC) and 10% spandex.

17. The method of claim 12, wherein the cover comprises a plurality of seams that are located underneath the electronic cymbal when the cover is installed on the electronic cymbal.

18. The method of claim 12, wherein a thickness of the material is 0.2 millimeters to 1.2 millimeters.

19. The method of claim 17, wherein the plurality of seams are approximately equidistant from each other.

20. The method of claim 17, wherein the plurality of seams are approximately the same length.

* * * * *